United States Patent Office 3,573,173
Patented Mar. 30, 1971

3,573,173
PROCESS FOR RECOVERING EXCESS AMMONIA IN UREA SYNTHESIS BY DIRECT CONTACT CONDENSATION WITH LIQUID AMMONIA
Eiji Otsuka, Kazumichi Kanai, and Tadao Sakai, Fujisawa, Shigeru Inoue, Kamakura, Nobuyoshi Hashimoto, Yokohama, Masatoshi Yakabe, Mobara, and Tetsuo Kimura, Kamakura, Japan, assignors to Mitsui Toatsu Chemicals Incorporated, Tokyo, Japan
Filed July 24, 1968, Ser. No. 747,336
Int. Cl. C07c $127/10$
U.S. Cl. 203—21                                                                 7 Claims

ABSTRACT OF THE DISCLOSURE

A process for recovering excess ammonia in urea synthesis which comprises separating excess ammonia from a urea synthesis effluent in the form of an ammonia gas, making the ammonia gas free of carbon dioxide if necessary and bringing the ammonia gas free of carbon dioxide with raw material liquid ammonia thereby the ammonia gas is condensed to form liquid ammonia at high temperature.

---

Figure 1:
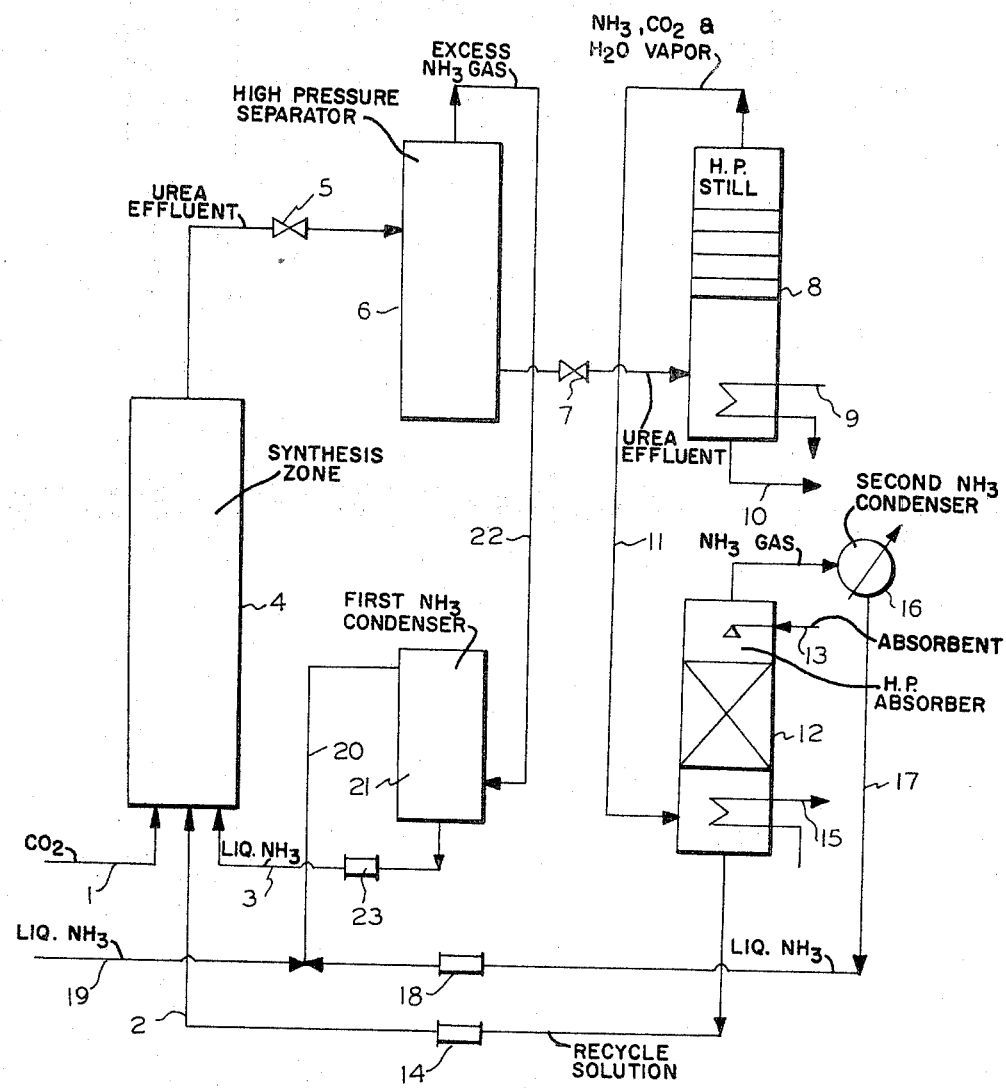

This invention relates to an improved process for recovering excess ammonia from a urea synthesis effluent in the urea synthesis using excess ammonia.

Generally, in urea synthesis using excess ammonia, excess ammonia is separated from the urea synthesis effluent containing urea, water, excess ammonia and unreacted ammonium carbamate by adiabatically expanding the urea synthesis effluent to a gauge pressure of 10 to 30 kg./cm.$^2$. A small amount of carbon dioxide contained in the separated ammonia is removed by a suitable method such as washing with water, and the ammonia is then cooled so as to be liquefied. The resulting liquid ammonia is joined with fresh liquid ammonia feed so as to be reused for the urea synthesis. Or a urea synthesis effluent containing urea, water, excess ammonia and unreacted ammonium carbamate is subjected to a high pressure distillation at a gauge pressure of 10 to 30 kg./cm.$^2$ so that the excess ammonia and the greater part of the unreacted ammonium carbamate is separated as a gaseous mixture of ammonia, carbon dioxide and water vapor. The gaseous mixture from the high pressure distillation is washed with an absorbent so that substantially all of the carbon dioxide and a part of the ammonia is absorbed. The unabsorbed excess ammonia is cooled with water so as to be liquefied and is joined with raw material ammonia so as to be reused for the synthesis of urea. In these cases, the condensation of the ammonia is carried out at 20 to 50° C. Therefore, the heat transferred to the cooling water in the cooling can not be utilized and becomes a loss.

On the other hand, in the case of the urea synthesis wherein ammonia is used in excess and the unreacted ammonium carbamate is recirculated in the form of an aqueous solution, the input and output of heat is not balanced in the urea synthesis autoclave. Therefore, it is conventional to supply heat by preheating the raw material ammonia. This temperature differs depending on the ratio of excess of ammonia and the amount of the recirculated unreacted ammonium carbamate and is usually 60 to 120° C., specifically about 80° C.

Thus, in the conventional urea synthesis process with solution recycle wherein excess ammonia is used, the excess ammonia must be cooled when it is to be recovered and must be preheated when it is to be used. Therefore, it is unreasonable in the heat economy. Further, a cooler is required for the recovery of ammonia and a preheater so pressure-proof as to be able to be used at the urea synthesis pressure is required for the preheating of ammonia.

An object of the present invention is to provide an improved method of recovering excess ammonia in the cyclic urea synthesis process.

Another object of the present invention is to provide method of recovering excess ammonia in the cyclic urea synthesis process is advantageous in the heat economy.

In the present invention, the following facts are utilized. That is to say, first, even when the condensation pressure for the ammonia gas is slightly elevated, the condensation temperature remarkably rises as evident from Table 1.

TABLE 1

Relations between the condensation pressure and temperature

| Condensation temperature in ° C.: | Condensation pressure in kg./cm.$^2$ |
|---|---|
| 20 | 8.68 |
| 30 | 11.83 |
| 40 | 15.76 |
| 50 | 20.61 |
| 60 | 26.5 |
| 70 | 33.5 |
| 80 | 41.9 |
| 90 | 51.8 |
| 100 | 63.4 |
| 120 | 93.0 |

That is to say, when liquid ammonia at 80° C. is to be obtained, the condensation pressure may be made 41.9 kg./cm.$^2$. Further, if an ammonia gas is condensed at 63.4 kg./cm.$^2$, liquid ammonia at 100° C. is obtained.

Second, it is known that the quantity of heat to be removed in the condensation is a function of the temperature. Generally, the higher the temperature, the smaller the quantity of heat. At the critical temperature, the quantity of heat becomes zero. That is to say, the higher the condensation temperature, the smaller the quantity of heat generated in the condensation. The relations between the condensation temperature and the heat of condensation are as indicated in Table 2.

TABLE 2

The relationshop between condensation temperature and heat of condensation

| Condensation temperature in ° C.: | Heat of condensation in kcal./kg. |
|---|---|
| 20 | 284 |
| 30 | 274 |
| 40 | 263 |
| 50 | 250 |
| 60 | 235 |
| 70 | 225 |
| 80 | 209 |
| 90 | 191 |
| 100 | 170 |
| 110 | 144 |
| 120 | 111 |
| 133 | 0 |

Third, the specific heat of liquid ammonia is considerably large as shown in Table 3 and the higher the temperature, the larger the specific heat.

TABLE 3

Specific heat of liquid ammonia

| Temperature in °C.: | Specific heat in kcal./kg. |
|---|---|
| 20 | 1.13 |
| 30 | 1.14 |
| 40 | 1.16 |
| 50 | 1.18 |
| 60 | 1.21 |
| 70 | 1.25 |
| 80 | 1.29 |
| 90 | 1.36 |
| 100 | 1.48 |
| 110 | 1.61 |

When the above described three observations are combined, a reasonable novel method of recovering excess ammonia is reached. That is to say, when the pressure of separating excess ammonia is elevated to the higher pressure than that in a conventional process, the condensation temperature for ammonia rises remarkably and the quantity of heat generated becomes considerably small. On the other hand, liquid ammonia at about 30° C. is newly fed as a raw material from an ammonia synthesis plant. Its amount is such has to substantially match the recovered ammonia in case the ratio of excess of ammonia is 100 to 150%. Therefore, the quantity of heat generated in case the excess ammonia is condensed can be canceled with the quantity of heat required to elevate the temperature of the new raw material liquid ammonia to the condensation temperature. When the condensation temperature becomes higher, the heat of condensation decreases due to the relations shown in Table 2 and, on the other hand, the quantity of heat required for elevating the temperature of the new raw material ammonia increases remarkably as evident from Table 3 and therefore the heat balance is reached at some temperature.

According to the present invention, there is provided a process for recovering excess ammonia in urea synthesis wherein carbon dioxide is reacted with stoichiometrically excess ammonia at a urea forming temperature and pressure, the excess ammonia contained in the resulting urea synthesis effluent is separated in the form of an ammonia gas at a pressure lower than said urea forming pressure, the separated ammonia gas is cooled to form liquid ammonia and the liquid ammonia is recirculated to the urea synthesis characterized in that said excess ammonia is separated from said urea synthesis effluent at a pressure substantially equal to the vapor pressure of ammonia at a condensation temperature at which the quantity of heat generated in the condensation of said ammonia gas is balanced with the quantity of heat required to elevate the temperature of the raw material liquid ammonia and the thus separated ammonia gas is mixed with the raw material liquid ammonia thereby ammonia gas is condensed to form said liquid ammonia at a high temperature.

In separating the excess ammonia, the urea synthesis effluent may be expanded to a pressure lower than that of the urea synthesis pressure and subjected to a high pressure distillation so that a part of the unreacted ammonium carbamate may be decomposed into a gaseous mixture of ammonia and carbon dioxide and distilled out together with the excess ammonia. The gaseous mixture are washed with water or an aqueous solution of ammonia, urea, ammonium carbamate or ammonium carbamate-urea to absorb substantially all of the carbon dioxide and a part of the ammonia in the above-described absorbent. The resulting gaseous excess ammonia free of carbon dioxide is liquefied as mixed with the raw material liquid ammonia as described above. The pressure of the high pressure distillation has a value substantially equal to the vapor pressure of ammonia at the condensation temperature at which the quantity of heat generated in the condensation of said excess gaseous ammonia is balanced with the quantity of heat required to elevate the temperature of the raw material liquid ammonia.

The present invention shall be concretely explained in the following with reference to the accompanying drawings.

FIG. 1 is a flow diagram illustrating a case of separating excess ammonia from a urea synthesis effluent by only expansion. Carbon dioxide, recycle solution and liquid ammonia are introduced into a urea synthesis autoclave 4 respectively through lines 1, 2 and 3 and are reacted at a temperature of 160 to 200° C. and a gauge pressure of 150 to 300 kg./cm.$^2$. The mol ratio $NH_3/CO_2$ of all the ammonia to all the carbon dioxide introduced into the urea synthesis autoclave is 2.5 to 6:1. The urea synthesis effluent containing urea, excess ammonia and unreacted ammonium carbamate from the urea synthesis autoclave 4 is adiabatically expanded to a gauge pressure of 40 to 120 kg./cm.$^2$ through a reduction valve 5 and is introduced into a high pressure separator 6 wherein the excess ammonia is separated at a temperature of 130 to 170° C. without heating. The urea synthesis effluent having the excess ammonia separated is expanded to a gauge pressure of 10 to 30 kg./cm.$^2$ through a reduction valve 7 and is introduced into a high pressure distillation column 8 wherein the greater part of the unreacted ammonium carbamate is distilled off in the form of a gaseous mixture of ammonia and carbon dioxide at 110 to 160° C. By the way, plates or a packing zone may be provided in the distillation column. In this case, the head temperature of the column is kept at 110 to 140° C. and the still temperature of the column is kept at 130 to 170° C. A heating pipe 9 is provided in the bottom part (still) of the high pressure distillation column. The urea synthesis effluent having the greater part of the unreacted ammonium carbamate removed is taken out through a line 10, expanded to a gauge pressure of 0 to 5 kg./cm.$^2$. Substantially all of the remaining unreacted ammonium carbamate is separated from the expanded effluent by distillation and the resulting aqueous urea solution is sent to a conventional finishing step to obtain urea. On the other hand, a gaseous mixture of ammonia, carbon dioxide and water vapor distilled off in the high pressure distillation column 8 is introduced into a high pressure absorption column 12 through a line 11 and is absorbed into water, an aqueous solution of urea or an aqueous solution of ammonium carbamate obtained by absorbing the gaseous mixture from a low pressure distillation column into water or an aqueous solution of urea as introduced through line 13. The resulting absorbate is compressed with a pump 14 and introduced as a recycle solution into the urea synthesis autoclave 4 through a line 2. The high pressure absorption column is cooled with a cooling pipe 15 provided in the bottom part of the column so that the bottom temperature of the column is kept at 80 to 120° C. The ammonia gas not absorbed in the high pressure absorption column 12 is cooled with water in a first ammonia condenser 16 to form liquid ammonia. The liquid ammonia is compressed with a pump 18 through a line 17, joined with fresh liquid ammonia feed introduced through a line 19 and is introduced into a second ammonia condenser 21 through a line 20. On the other hand, the excess ammonia gas separated in the high pressure separator 6 is washed with water, an aqueous solution of ammonia, an aqueous solution of ammonium carbamate or an aqueous solution of ammonium carbamate and urea if necessary to have the slight amount of the contained carbon dioxide removed, is then introduced into the second ammonia condenser 21 through a line 22 and is liquefied as mixed with liquid ammonia introduced through a line 20 to form liquid ammonia. The liquid ammonia is compressed to a urea synthesis pressure with a pump 23, preheated if necessary to a higher temperature and then introduced into the urea synthesis autoclave 4 through the line 3. Further, some ammonia not condensed in the ammonia condenser 21 is liquefied by being water-cooled in a cooler not illustrated and is returned to the ammonia condenser 21. A small amount of ammonia in an inert gas contained in the raw material liquid ammonia and discarged out of the cooler is washed with water and recovered as an aqueous solution of ammonia.

When the quantity of the fresh liquid ammonia feed introduced into the second ammonia condenser 21 is $W_1$, the quantity of the recovered liquid ammonia introduced into the second ammonia condenser 21 is $W_3$ and the quantity of the ammonia gas introduced into the second ammonia condenser 21 is $W_2$, the pressure in the high pressure separator 6 can be determined as follows. That is to say, as the heat of condensation L is represented by $$L = F_1(t) = 32.94\sqrt{133-t} - 0.59(133-t)$$

the quantity of the generated heat is $$W_2 L = W_2 F_1(t)$$

In case the temperature of the liquid ammonia is 30° C., the quantity of heat required to elevate the temperature of $W_1 + W_3$ of the liquid ammonia to $t°$ C. is $$\int_{30}^{t} (W_1 + W_3) C_p dt$$

in which $C_p$ is the specific heat of ammonia at constant pressure as represented by $$2.78 - 0.0146(273+t) + 0.0000304(273+t)^2$$

Therefore, the condensation temperature is determined as a solution of the equation $$W_2 F_1(t) = (W_1 + W_3) \int_{30}^{t} C_p dt$$

When the condensation temperature is determined, the pressure P kg./cm.$^2$ by gauge in the high pressure separator is determined from the equation $$\log_{10} P = 27.376 - 1914.957/(273+t)$$
$$-8.460 \log (273+t) + 2.393 \times 10^{-3}(273+t) + 2.955 \times 10^{-6}(273+t)^2$$

formulating Table 1.

In the case of the present invention, $W_3$ is a constant which can be freely selected. That is to say, in case substantially all of the excess ammonia is separated in the high pressure separator, $W^3$ is equal to zero and this operation is well possible to work. $W_2 + W_3$ is considered to be a substantially total quantity of the excess ammonia but the quantity of $W_3$ can be freely chosen. The smaller the value of $W_3$, the higher the pressure in the high pressure separator and therefore the temperature of the liquid ammonia entering the synthesis autoclave rises. The larger the value of $W_3$, the lower the pressure in the high pressure separator and therefore the temperature of the liquid ammonia entering the synthesis autoclave reduces. Therefore, $W_3$ may be set at a desirable quantity by referring to the preheating temperature for the liquid ammonia and the operation conditions for the high pressure separator.

Figure 2:
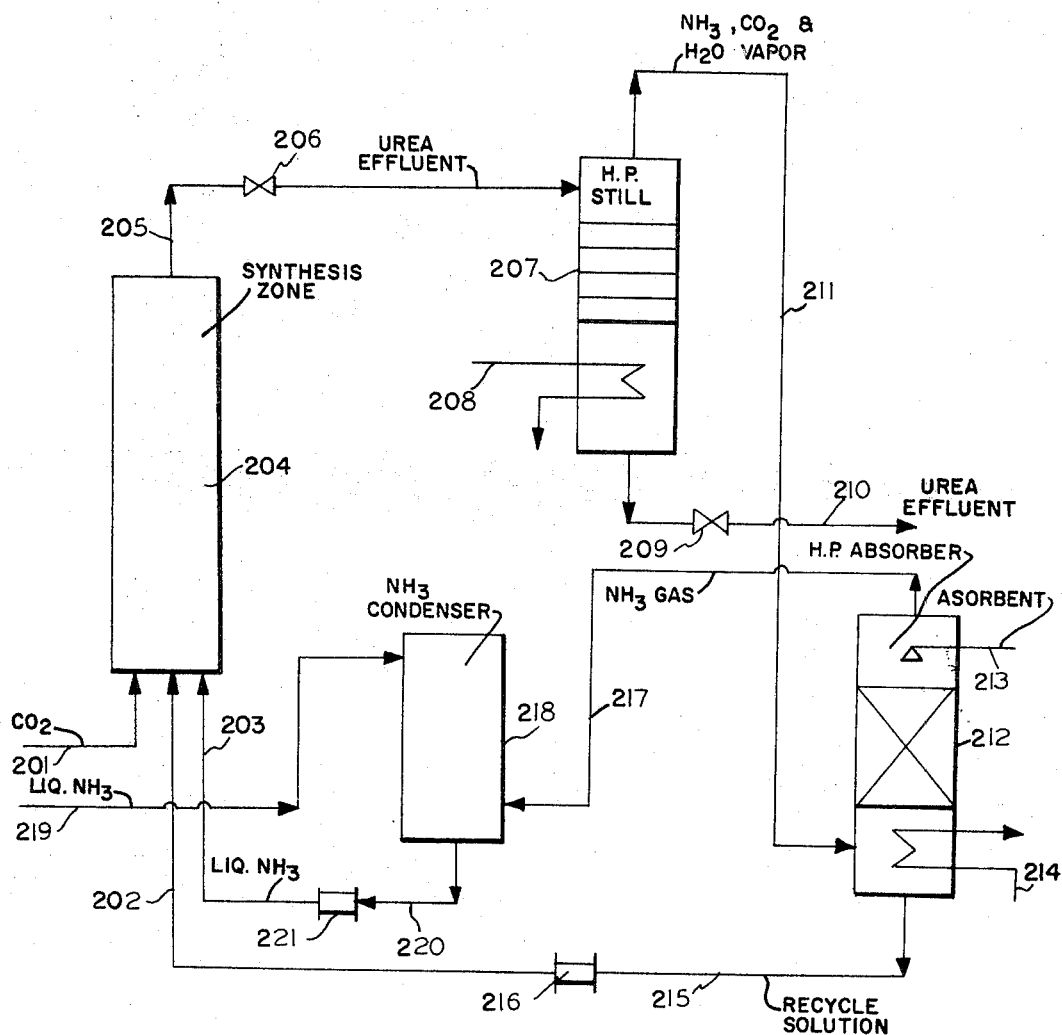

FIG. 2 is a flow diagram illustrating a case of separating excess ammonia together with a part of ammonium carbamate by subjecting the urea synthesis effluent to a high pressure distillation. Carbon dioxide, a recycle solution obtained in the later described absorption step and liquid ammonia are introduced into a urea synthesis autoclave 204 respectively through lines 201, 202 and 203 and are reacted at a temperature of 160 to 220° C. and a gauge pressure of 150 to 300 kg./cm.$^2$. The mol ratio $NH_3/CO_2$ of all the ammonia to all the carbon dioxide introduced into the urea synthesis autoclave is 2.5 to 6:1. The urea synthesis effluent containing urea, water, excess ammonia and unreacted ammonium carbamate from the urea synthesis autoclave 204 is expanded to a gauge pressure of 30 to 150 kg./cm.$^2$, preferably 40 to 120 kg./cm.$^2$ with a reduction valve 206 through a line 205 and is introduced into a high pressure distillation column 207. The unreacted ammonium carbamate and excess ammonia are seperated by the distillation as a gaseous mixture of ammonia, carbon dioxide and water vapor at a temperature higher than 130° C., preferably of 140 to 180° C. 208 is a heating pipe by which the high pressure distillation column is kept at the above-mentioned temperature. The high pressure distillation column may have plates or a packing zone within it. In this case, the still temperature of the column is kept at 140 to 180° C. and the head temperature of the column is kept at 120 to 160° C. In the high pressure distillation column, the greater part of the excess ammonia in the urea synthesis effluent is separated but the decomposition ratio of the unreacted ammonium carbamate varies depending on the distillation conditions.

The urea synthesis effluent from the high pressure distillation column 207 is expanded through a reduction valve 209. The expanded urea synthesis effluent is taken out through a line 210 and has the remaining unreacted ammonium carbamate separated by a known process (not shown in the drawing )so that crystalline urea or granular urea may be obtained. That is to say, for example, the urea synthesis effluent from the high pressure distillation column 207 is expanded to a gauge pressure of 10 to 30 kg./cm.$^2$. The greater part of the remaining unreacted ammonium carbamate is separated from the expanded effluent by distillation. The effluent is further expanded to a gauge pressure of 0 to 5 kg./cm.$^2$ and subjected to distillation to separate all the remaining unreacted ammonium carbamate. The gaseous mixture distilled off at a gauge pressure of 0 to 5 kg./cm.$^2$ is absorbed into water or an aqueous solution of ammonia or urea. The thus obtained first absorbate is compressed and the gaseous mixture separated at a gauge of 10 to 30 kg./cm.$^2$ is absorbed into this absorbate to obtain a second absorbate. The second absorbate is used as described later. Or the urea synthesis effluent from the high pressure distillation column 207 is subjected to a low presure distillation in one step or a plurality of steps to distill off the remaining unreacted ammonium carbamate. The separated gaseous mixture of ammonia and carbon dioxide may be used for the production of ammonium sulfate, nitric acid, ammonium nitrate or ammonium phosphate or may be separated into ammonia and carbon dioxide with a selective solvent such as ethanol amine so as to be respectively recirculated to the synthesis of urea.

On the other hand, the gaseous mixture of ammonia and carbon dioxide distilled off in the high pressure distillation column 207 is introduced into the bottom part of a high pressure absorption column 212 through a line 211 and is brought into contact with water or an aqueous solution of ammonia, urea, ammonium carbamate or ammonium carbamate-urea introduced from the top of the column through a line 213 so that substantially all of the carbon dioxide and a part of the ammonia in said gaseous mixture is absorbed. 214 is a cooling pipe provided in the absorption column 212. With this cooling pipe, the heat of absorption is utilized as a heating source for steam generation or any other uses and the temperature of the bottom part of the column is kept at 120 to 180° C. Needless to say, in case the amount of the carbon dioxide contained in the gas from the high pressure distillation column 207 is comparatively small, this cooling pipe may be omitted. Further, the above described second absorbate obtained at a gauge pressure of 10 to 30 kg./cm.$^2$ may be introduced in the absorption column 212 through the line 213. The absorbate obtained in the high pressure absorption column 212 is compressed with a pump 216 through a line 215 and is recirculated to the urea synthesis autoclave 204 through the line 202.

The excess ammonia not absorbed in the high pressure absorption column 212 is washed with water or an aqueous solution of ammonia or urea to have the slight amount of the contained carbon dioxide removed and is then introduced into an ammonia condenser 218 through a line 217. At the same time, fresh liquid ammonia feed is introduced into the ammonia condenser 18 through a line 219 and is brought into contact with the excess ammonia introduced through the line 217 to cool and liquify it. The resulting liquid ammonia is compressed with a pump 221 through a line 20 and is introduced into the urea synthesis autoclave 204 through the line 203. The ammonia not condensed in the ammonia condenser 218 is further liquefied by being water-cooled in a cooler (not shown) and is returned to the ammonia condenser 218. An inert gas contained in the raw material liquid ammonia is discharged out of the cooler and is washed with water to recover a small amount of ammonia contained therein as an aqueous solution of ammonia.

According to the present invention, as excess ammonia is liquified by being mixed with the raw material liquid ammonia, it is not necessary to use cooling water and further, as the resulting liquid ammonia is at such high temperature as above 60° C., it is either not necessary to preheat the liquid ammonia prior to introducing it into the urea synthesis autoclave or it is sufficient for the heat balance in the urea synthesis autoclave to slightly preheat it. In case the excess ammonia is to be separated by the high pressure distillation as described above, the high pressure absorption step is carried out at a temperature higher than in the conventional process and therefore the heat of absorption generated can be effectively utilized as steam or any other heat source. Further, though a solution recycle is adopted the heat balance in the urea synthesis autoclave can be improved as the absorbate at a high temperature is recirculated to the urea synthesis autoclave and also the liquid ammonia introduced into the urea synthesis autoclave is at a high temperature.

Examples of the present invention are shown in the following.

EXAMPLE 1

73.3 kg./hr. of carbon dioxide, 79.7 kg./hr. of ammonia at 150° C. and 237.0 kg./hr. of a recycle solution (consisting of 100.7 kg./hr. of ammonia, 79.4 kg./hr. of carbon dioxide and 56.9 kg./hr. of water) at 90° C. were fed into a urea synthesis autoclave kept at a temperature of 190° C. and a gauge pressure of 180 kg./cm.² The urea synthesis effluent coming out of this urea synthesis autoclave and consisting of 100.0 kg./hr. of urea, 123.7 kg./hr. of ammonia, 79.4 kg./hr. of carbon dioxide and 86.9 kg./hr. of water was expanded and introduced into a high pressure separator kept at a gauge pressure of 55 kg./cm.². 23.0 kg./hr. of gaseous ammonia separated in this high pressure separator at 165° C. were condensed as mixed with 56.7 kg./hr. of raw material liquid ammonia fed at 30° C. in an ammonia condenser to form 79.7 kg./hr. of liquid ammonia at 90° C. This liquid ammonia heated to 150° C. in an ammonia preheater and was fed into the urea synthesis autoclave.

On the other hand, the urea synthesis effluent coming out of the bottom part of the high pressure separator and consisting of 100.0 kg./hr. of urea, 100.7 kg./hr. of ammonia, 79.4 kg./hr. of carbon dioxide and 86.9 kg./hr. of water was further expanded and introduced into the upper part of a high pressure distillation column having rectifying plates and kept at a gauge pressure of 15 kg./cm.² and a still temperature of 145° C. to distill off the remaining excess ammonia and the unreacted ammonium carbamate. The effluent coming out of the bottom part of the high pressure distillation column consisted of 100.0 kg./hr. of urea, 20.7 kg./hr. of ammonia, 17.0 kg./hr. of carbon dioxide and 80.0 kg./hr. of water. In the subsequent lower pressure recovery step, the unreacted ammonia and carbon dioxide remaining in the effluent were recovered and the product urea was obtained.

The gas coming out of the top part of the high pressure distillation column and consisting of 80.0 kg./hr. of ammonia, 62.4 kg./hr. of carbon dioxide and 6.9 kg./hr. of water was introduced into a high pressure absorption column kept at a gauge pressure of 15 kg./cm.². 87.7 kg./hr. of an aqueous solution recovered in the low pressure recovery step and containing 20.7 kg./hr. of ammonia and 17.0 kg./hr. of carbon dioxide were introduced into a high pressure absorption column from the upper part to absorb all the gas coming from the high pressure distillation column. In the bottom part of the high pressure absorption column, the absorbate became a solution consisting of 100.7 kg./hr. of ammonia, 79.4 kg./hr. of carbon dioxide and 56.9 kg./hr. of water, was compressed and introduced into the urea synthesis autoclave as the afore-mentioned recycle solution.

EXAMPLE 2

73.3 kg./hr. of carbon dioxide, 131.7 kg./hr. of liquid ammonia at 100° C. and a recycle solution (consisting of 43.2 kg./hr. of ammonia, 37.8 kg./hr. of carbon dioxide and 27.0 kg./hr. of water) at a temperature of 100° C. were fed into a urea synthesis autoclave kept at a temperature of 190° C. and a gauge pressure of 220 kg./cm².

The urea synthesis effluent coming out of the synthesis autoclave and consisting of 100.0 kg./hr. of urea, 118.2 kg./hr. of ammonia, 37.8 kg./hr. of carbon dioxide and 57.0 kg./hr. of water was expanded and introduced into a high pressure separator kept at a gauge pressure of 68 kg./cm.². 55.6 kg./hr. of gaseous ammonia separated at 150° C. were mixed in a second ammonia condenser with 56.7 kg./hr. of fresh liquid ammonia feed at 30° C. and 19.4 kg./hr. of liquid ammonia at 30° C. introduced from a first ammonia condenser to obtain 131.7 kg./hr. of liquid ammonia at 100° C. The obtained liquid ammonia was fed to the urea synthesis autoclave.

The urea synthesis effluent coming out of the bottom part of the high pressure separator and consisting of 100.0 kg./hr. of urea, 62.6 kg./hr. of ammonia, 37.8 kg./hr. of carbon dioxide and 57.0 kg./hr. of water was further expanded and introduced into the upper part of a high pressure distillation column having rectifying plates and kept at a gauge pressure of 15 kg./cm.² and a still temperature of 150° C. to distill off the remaining excess ammonia and the unreacted ammonia and carbon dioxide.

The effluent coming out of the bottom part of the high pressure distillation column consisted of 100.0 kg./hr. of urea, 13.5 kg./hr. of ammonia, 9.0 kg./hr. of carbon dioxide and 52.2 kg./hr. of water. In the subsequent low pressure recovery step, the unreacted ammonia and carbon dioxide remaining in the effluent were recovered and the product urea was obtained.

The gas coming out of the top part of the high pressure distillation column and consisting of 49.1 kg./hr. of ammonia, 28.8 kg./hr. of carbon dioxide and 4.8 kg./hr. of water was introduced into a high pressure absorption column at a gauge pressure of 15 kg./cm.². Substantially all the carbon dioxide and a part of the ammonia were absorbed into a solution introduced from the low pressure recovery step and consisting of 13.5 kg./hr. of ammonia, 9.0 kg./hr. of carbon dioxide and 22.2 kg./hr. of water. The absorbate was fed to the urea synthesis autoclave as the recycle solution consisting of 43.2 kg./hr. of ammonia, 37.8 kg./hr. of carbon dioxide and 27.0 kg./hr. of water at a temperature of 100° C. from the bottom part of the high pressure absorption column.

On the other hand, all the amount of 19.4 kg./hr. of gaseous ammonia coming out of the top part of the high pressure absorption column was condensed in a first ammonia condenser to form liquid ammonia at a temperature of 30° C. This liquid ammonia was introduced into the second ammonia condenser.

EXAMPLE 3

141.8 kg./hr. of carbon dioxide, 267.2 kg./hr. of a recycle solution from the later described high pressure absorption step and 252.0 kg./hr. of liquid ammonia were reacted in a urea synthesis autoclave. The resulting urea synthesis effluent consisting of 236.2 kg./hr. of urea, 240.4 kg./hr. of ammonia, 70.0 kg./hr. of carbon dioxide and 114.4 kg./hr. of water was expanded through a reduction valve and was introduced into a high pressure distillation column kept at a gauge pressure of 65 kg./cm.$^2$ wherein it was heated with a heater provided in the lower part of the column to separate a gaseous mixture at 160° C. consisting of 100.0 kg./hr. of ammonia, 13.8 kg./hr. of carbon dioxide and 4.8 kg./hr. of water. The urea synthesis effluent from the high pressure distillation column was further expanded through a reduction valve and fed to the subsequent recovery step. By the way, in the lower pressure distillation in the recovery step, stripping by a part of the raw material carbon dioxide was carried out.

The gaseous mixture separated in the high pressure distillation column was introduced into a high pressure absorption column kept at a gauge pressure of 64.5 kg./cm.$^2$ and was washed with a washing solution at 100° C. fed in from the above-mentioned recovery step and consisting of 25.4 kg./hr. of urea, 92.8 kg./hr. of ammonia, 69.0 kg./hr. of carbon dioxide and 46.4 kg./hr. of water to absorb substantially all of the carbon dioxide and a part of the ammonia. The heat of absorption generated in the absorption was removed by generating 15 kg./hr. of steam at a gauge pressure of 2 kg./cm.$^2$ to keep the solution temperature in the bottom of the absorption column at 140° C. The absorbate obtained in the high pressure absorption column and consisted of 25.4 kg./hr. of urea, 107.8 kg./hr. of ammonia, 82.8 kg./hr. of carbon dioxide and 51.2 kg./hr. of water was compressed with a pump and fed into the urea synthesis autoclave as the above described recycle solution.

On the other hand, 85.0 kg./hr. of excess gaseous ammonia not absorbed in the high pressure absorption column and free from carbon dioxide were introduced into an ammonia condenser kept at a gauge pressure of 64 kg./cm.$^2$ and were condensed in contact with 167.0 kg./hr. of liquid ammonia at 25° C. fed in at the same time (including 52.8 kg./hr. of liquid ammonia recovered in the above described recovery step) to form 252.0 kg./hr. of liquid ammonia at 100° C. The liquid ammonia was compressed with a pump and was fed to the urea synthesis autoclave as described above.

EXAMPLE 4

141.8 kg./hr. of carbon dioxide, 267.2 kg./hr. of a recycle solution from the later described high pressure absorption step and 252.0 kg./hr. of liquid ammonia were reacted in a urea synthesis autoclave. The resulting urea synthesis effluent consisting of 236.2 kg./hr. of urea, 240.4 kg./hr. of ammonia, 70.0 kg./hr. of carbon dioxide and 114.4 kg./hr. of water was expanded through a reduction valve and introduced into a high pressure distillation column kept under a gauge pressure of 80 kg./cm.$^2$ wherein it was heated with a heater provided in the lower part of the column to separate a gaseous mixture at 165° C. consisting of 152.8 kg./hr. of ammonia, 21.2 kg./hr. of carbon dioxide and 6.2 kg./hr. of water. The urea synthesis effluent from the high pressure distillation column was further expanded through a reduction valve and was fed to the subsequent recovery step. By the way, in the low pressure distillation in the recovery step, stripping by a part of the raw material carbon dioxide was carried out. The gaseous mixture separated in the high pressure distillation column was introduced into a high pressure absorption column kept at a gauge pressure of 79.5 kg./cm.$^2$ and was washed with a washing solution at 80° C. fed in from the above-mentioned recovery step and consisting of 25.4 kg./hr. of urea, 92.8 kg./hr. of ammonia, 61.6 kg./hr. of carbon dioxide and 45.0 kg./hr. of water to absorb substantially all of the carbon dioxide and water and a part of the ammonia. The heat of absorption generated in the absorption was removed by generating 20 kg./hr. of steam at a gauge pressure of 2 kg./cm.$^2$ to keep the solution temperature in the bottom of the absorption column at 150° C. The absorbate obtained in the high pressure absorption column and consisting of 25.4 kg./hr. of urea, 107.8 kg./hr. of ammonia, 82.8 kg./hr. of carbon dioxide and 51.2 kg./hr. of water was compressed with a pump and fed into the urea synthesis autoclave as the above described recycle solution.

On the other hand, 137.8 kg./hr. of excess gaseous ammonia not absorbed in the high pressure absorption column and free from carbon dioxide were introduced into an ammonia condenser kept at a gauge pressure of 79 kg./cm.$^2$ and were condensed in contact with 114.2 kg./hr. of liquid ammonia at 25° C. fed in at the same time to form 252.0 kg./hr. of liquid ammonia at 110° C. in all. The liquid ammonia was compressed with a pump and fed into the urea synthesis autoclave as described above.

What is claimed is:

1. In a process for recycling excess ammonia from a urea synthesis effluent obtained by reacting carbon dioxide with a stoichiometric excess of ammonia in a synthesis zone including the steps of separating excess ammonia under pressure from said effluent, condensing said excess ammonia by contact with liquid ammonia at a condensation temperature and recycling the condensed excess to said zone as hot liquid ammonia, the improvement comprising maintaining said pressure substantially equal to the vapor pressure of ammonia at said condensation temperature and selecting said condensation temperature to provide heat of condensation substantially equal to heat required to increase said liquid ammonia to said condensation temperature wherein a major portion of said excess ammonia is condensed and recycled.

2. The improvement as claimed in claim 1 wherein said pressure is 40 to 120 kg./cm.$^2$ gauge.

3. The improvement as claimed in claim 2 wherein the separation of said excess ammonia is separated by adiabatically expanding said effluent.

4. The improvement as claimed in claim 2 wherein the separation of said excess ammonia is separated by subjecting said urea synthesis effluent to distillation at a temperature of 140 to 180° C. to distill off a gaseous mixture of said excess ammonia and a part of the unreacted ammonia and carbon dioxide.

5. The improvement as claimed in claim 3 wherein said effluent is distilled after separation of said excess ammonia, the resulting gas containing ammonia and carbon dioxide is scrubbed with an absorbent selected from the group consisting of water, an aqueous ammonia solution, an aqueous ammonium carbamate solution and an aqueous ammonium carbamate-urea solution to remove carbon dioxide contained in said gas, said gas is compressed to a liquid and combined with additional ammonia to provide said liquid ammonia.

6. The improvement as claimed in claim 4 wherein said gaseous mixture is contacted with an absorbent selected from the group consisting of water, an aqueous ammonia solution, an aqueous ammonium carbamate solution and an aqueous ammonium carbamate-urea solution to absorb in said absorbent the carbon dioxide contained in said gaseous mixture and a part of the ammonia and combined with additional ammonia to provide said liquid ammonia.

7. The improvement as claimed in claim 6 wherein heat generated by the absorption is utilized for generation of steam.

(References on following page)

References Cited

UNITED STATES PATENTS

| | | | |
|---|---|---|---|
| 2,116,881 | 5/1938 | De Ropp | 260—555 |
| 3,072,721 | 1/1963 | Grossmann | 260—555 |
| 3,090,811 | 5/1963 | Otsuka et al. | 260—555 |
| 3,114,681 | 12/1963 | Brekart et al. | 260—555 |
| 3,155,722 | 11/1964 | Mavrovic | 260—555 |
| 3,258,486 | 6/1966 | Cook | 260—555 |
| 3,270,050 | 8/1966 | Mavrovic | 260—555 |
| 3,281,464 | 10/1966 | Tsao | 260—555 |
| 3,347,915 | 10/1967 | Fauser | 260—555 |
| 3,349,126 | 10/1967 | Hsu et al. | 260—555 |

WILBUR L. BASCOMB, Jr., Primary Examiner

U.S. Cl. X.R.

23—193; 202—185; 203—42, 73, 87, 88, 91; 260—555